United States Patent
Barani et al.

(10) Patent No.: US 6,702,543 B1
(45) Date of Patent: Mar. 9, 2004

(54) DEVICE FOR CONTROLLING MOVEMENT OF SKIPS FOR TREATMENT OF GRANULAR OR POWDER AND LIQUID MATERIALS

(75) Inventors: Ruggero Barani, Modena (IT); Andrea Nora, Modena (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 0 days.

(21) Appl. No.: 10/089,257
(22) PCT Filed: Aug. 22, 2000
(86) PCT No.: PCT/IT00/00344
§ 371 (c)(1),
(2), (4) Date: Mar. 28, 2002
(87) PCT Pub. No.: WO01/23286
PCT Pub. Date: Apr. 5, 2001

(30) Foreign Application Priority Data

Sep. 28, 1999 (IT) ....................................... MO990047 U

(51) Int. Cl.[7] .............................................. B65G 65/23
(52) U.S. Cl. ...................................... 414/421; 414/419
(58) Field of Search ................................. 414/419, 420, 414/421, 425; 298/2, 10; 294/68.26, 68.27

(56) References Cited

U.S. PATENT DOCUMENTS

| 2,756,883 | A | * | 7/1956 | Schreck | 414/420 |
|---|---|---|---|---|---|
| 3,844,615 | A | * | 10/1974 | Anderson | 298/10 |
| 3,971,485 | A | * | 7/1976 | Hoppey | 414/420 |
| 4,515,510 | A | * | 5/1985 | Heward et al. | 414/422 |
| 5,302,073 | A | * | 4/1994 | Riemersma et al. | 414/421 |
| 5,626,073 | A | * | 5/1997 | Bauer | 99/337 |
| 5,723,160 | A | | 3/1998 | Nora et al. | |

FOREIGN PATENT DOCUMENTS

| DE | 195 32 035 A1 | 4/1996 |
|---|---|---|
| FR | 992 164 A1 | 10/1951 |

* cited by examiner

Primary Examiner—Dean J. Kramer
(74) Attorney, Agent, or Firm—Browdy and Neimark

(57) ABSTRACT

The device for controlling the movement of skips in machines for granular or powder and liquid treatment machines is of a type where the skip is separable from an overlying treatment chamber, to which it is sealingly couplable and which skip is rotatably supported by a horizontal-axis pivot (2) on a frame (3) mobile on wheels (4). The device comprises at least one hydraulic cylinder (5) provided with a piston (15) comprised between two chambers (25, 35), which cylinder (5) bears a rotating organ (45) coupled in rotation with the pivot (2). The two chambers (25, 35) are interconnected with an interpositioning of at least one regulation valve (6) which on command can regulate the flow of a hydraulic fluid in two directions and can also totally halt the flow.

5 Claims, 1 Drawing Sheet

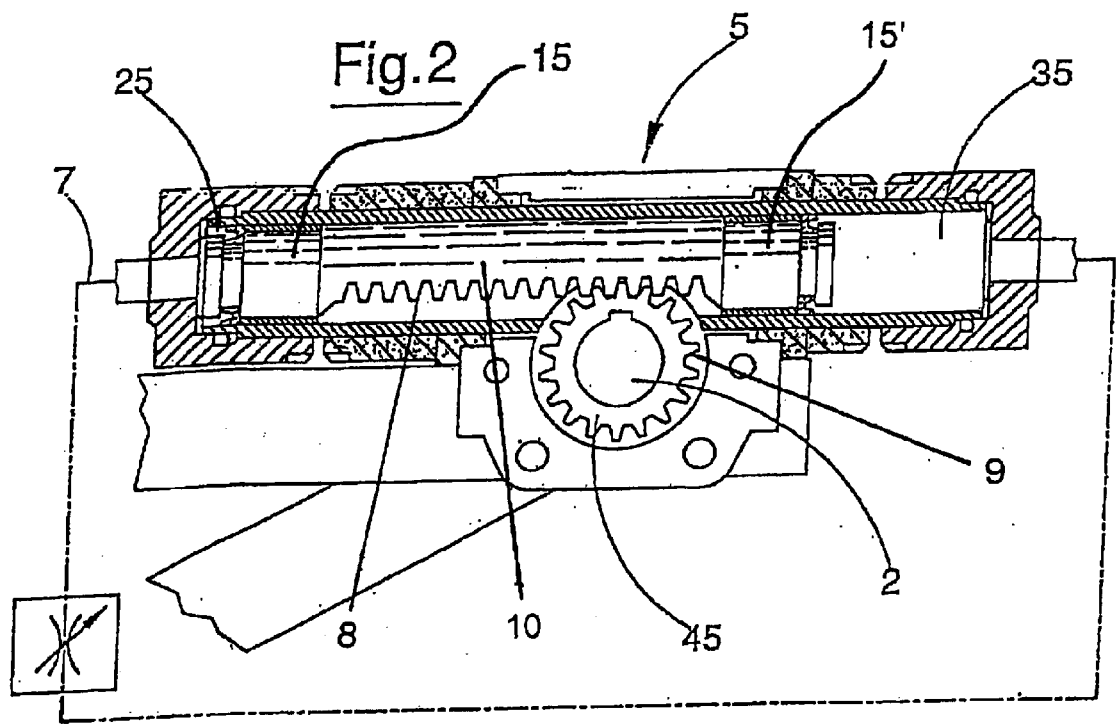
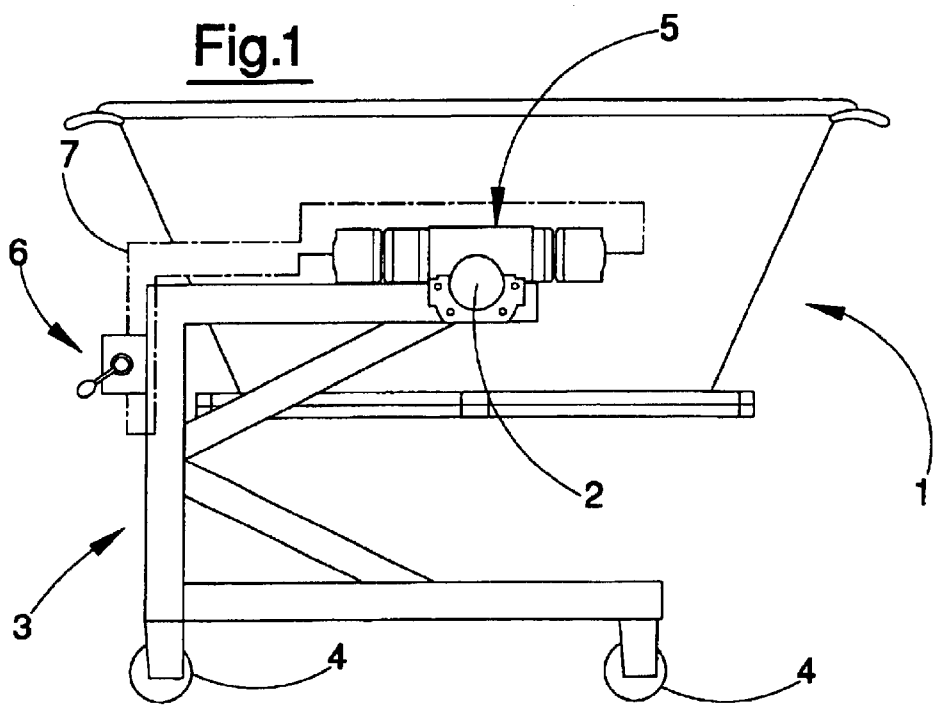

DEVICE FOR CONTROLLING MOVEMENT OF SKIPS FOR TREATMENT OF GRANULAR OR POWDER AND LIQUID MATERIALS

TECHNICAL FIELD

The invention relates to a device for controlling movement of skips for treatment of granular or powder and liquid materials.

Specifically, though not exclusively, it is usefully applied in the movement of skips, or silos, in powder agglomeration plants arranged at the base of overlying agglomeration chambers, to which they are sealingly couplable and which are singly supported by means of pivots—which enable the skip to be rotated and emptied—on frames, normally mobile on wheels.

BACKGROUND ART

Prior-art skips, such as for example those "silos" illustrated in publication EP 069514, are at present moved, i.e. rotated to tip them up, and are provided with very simple mechanical blocking mechanisms which enable them to be stopped in predetermined positions. These mechanisms usually consist of pegs which, associated to one or the other of the two mobile parts, have to be manually inserted in special holes made in the other mobile part.

The above-described movement systems, although very simple, are equally impractical, requiring a considerable physical effort on the part of the operator, who cannot therefore work with the necessary concentration and attention to detail.

The main aim of the present invention is to obviate the limitations and drawbacks in the prior art.

An advantage of the invention is that it is very simply constructed.

A further advantage is that the skip can be gradually rotated as required during the tipping stage.

These aims and advantages and others besides are all achieved by the invention, as it is characterised in the appended claims.

BRIEF DESCRIPTION OF THE DRAWINGS

Further characteristics and advantages of the present invention will better emerge from the detailed description that follows of a preferred but non-exclusive embodiment of the invention, illustrated purely by way of non-limiting example in the accompanying figures of the drawings, in which:

FIG. 1 is a schematic overview in vertical elevation;

FIG. 2 is an enlarged-scale view in section of a detail of FIG. 1, showing the hydraulic circuit system.

BRIEF DESCRIPTION OF THE PREFERRED EMBODIMENT OF THE INVENTION

With reference to the above-mentioned figures of the drawings, denotes in its entirety a skip in a machine for treating granular or powder materials, in particular for a powder-agglomiieration machine. The machine is of the type which can be detached from an overlying treatment chamber, to which it is sealingly couplable while agglomeration is being carried out.

The skip is rotatably supported, by means of a horizontal-axis pivot 2, on a frame 3, which is mobile on wheels 4.

A hydraulic jack is fixed to the frame 3 comprises a hydraulic cylinder 5 and a pair of pistons 15, 15' spaced apart by a rackc 10 with teeth 8 engaged to corresponding teeth 9 on a rotating organ (pinion) 45 extending into cylinder 5. The rotating organ 45 is coupled in rotation with the pivot 2 and the cylinder 5 is provided with an inlet and an outlet for fluid, which are reciprocally connected through a closed circuit in which a regulation valve 6 is inserted to move the pistons 15, 15' alternately back and forth. The regulation valve 6 can, when turned either clockwise or counterclockwise initiates a flow of the fluid which moves either piston 15 or 15' in opposite directions in cylinder 5, or can intercept it totally.

In particular, the hydraulic cylinder 5 is fixed on the frame 3 and pistons 15 and $15^1$ are located between two chambers 25 and 35 which receive the fluid when valve 6 is turned either clockwise or counterclockwise to initiate the flow of fluid.

The rotating organ (pinion) 45 of the hydraulic cylinder 5 is coupled in rotation with the pivot 2 and the two chambers 25 and 35 are reciprocally connected through a pipe 7, with the interpositioning of at least one regulation valve 6 which commendably regulates the flow of the fluid in both directions through pipe 7, or can intercept it totally.

The rotating organ is solidly and coaxially coupled to the pivot 2.

The two chambers 25 and 35, are therefore connected up within a closed circuit in which the regulation valve 6, constituted for example by a simple choke, when closed can block any rotation of the skip 1 and, when open, can control any rotation movement by the skip 1.

By controlledly opening the valve 6 the flow of fluid can be varied, for example the flow of fluid exiting from the chamber 35 and entering the chamber 25. In this way the axial displacement speed of the pistons 15, 15' can be varied and, consequently, the rotation speed of the skip 1 about the pivot 2 axis.

Obviously, when the valve 6 is closed the communication between the two chamber 25 and 35 is blocked, as is the pistons 15, 15' and therefore the rotation of the skip 1.

The operator is spared the effort needed in prior art applications and can dedicate his or her full attention to the tipping of the skip.

What is claimed is:

1. A device for controlling movement of skips in machines for treatment of granular or powder and liquid materials, in which the skip is separable from an overlying treatment chamber, to which treatment chamber the skip is sealing couplable, and which skip is rotatably supported, by means of a horizontal-axis pivot (2), on a frame (3) mobile on wheels (4); wherein the device comprises:

at least one hydraulic jack provided with a hydraulic cylinder fixed to the frame and a first and second piston slidably engaged within the hydraulic cylinder;

the pair of piston being spaced apart on a rack fixed between the first and second pistons;

a pinion on the horizontal-axis pivot rotatably engaged to the rack;

the hydraulic cylinder having an inlet and outlet for hydraulic fluid reciprocally connected in a closed circuit including one regulation valve;

wherein the regulation valve when turned either clockwise or counterclockwise initiates a flow of fluid against either the first piston or the second piston which moves the corresponding piston and the rack which rotates the pinion.

2. The device according to claim 1, wherein the first and second pistons are slidably engaged in a chamber, each said chamber being reciprocally connected with the regulation valve to receive the flow of fluid.

3. The device according to claim 1, wherein the rack and the pinion are engaged by corresponding teeth on the rack and the pinion.

4. The device according to claim 1, wherein the pinion is solidly and coaxially coupled to the pivot.

5. The device according to claim 1, wherein the pinion extends into the hydraulic cylinder to engage the rack.

* * * * *